(12) United States Patent
Ben-Eli

(10) Patent No.: US 6,301,317 B1
(45) Date of Patent: Oct. 9, 2001

(54) SYNCHRONIZATION SYSTEM AND METHOD FOR DIGITAL COMMUNICATION SYSTEMS

(75) Inventor: Dudi Ben-Eli, Modiin (IL)

(73) Assignee: D.S.P.C. Technologies Ltd., Givat Shmuel (IL)

( * ) Notice: Subject to any disclaimer, the term of this patent is extended or adjusted under 35 U.S.C. 154(b) by 0 days.

(21) Appl. No.: 08/910,817

(22) Filed: Aug. 13, 1997

(30) Foreign Application Priority Data

Feb. 13, 1997 (IL) .......................................... 120210

(51) Int. Cl.[7] .............................. H04L 7/00; H04B 7/212
(52) U.S. Cl. ........................... 375/365; 370/442; 370/321
(58) Field of Search .................................... 375/365, 354, 375/366, 262, 341, 357, 368; 370/514, 513, 503, 350, 337, 321, 304, 342, 442, 347

(56) References Cited

U.S. PATENT DOCUMENTS

| | | | |
|---|---|---|---|
| 5,177,740 | * 1/1993 | Toy et al. | 370/337 |
| 5,276,706 | 1/1994 | Critchlow | 375/13 |
| 5,282,227 | 1/1994 | Crawford | 375/81 |
| 5,343,498 | * 8/1994 | Toy et al. | 375/259 |
| 5,361,276 | 11/1994 | Subramanian | 375/1 |
| 5,608,763 | * 3/1997 | Chiasson et al. | 375/332 |
| 5,625,573 | 4/1997 | Kim | 364/514 R |
| 5,802,117 | * 9/1998 | Ghosh | 375/344 |
| 5,910,945 | * 6/1999 | Garrisson et al. | 370/324 |

* cited by examiner

Primary Examiner—Chi H. Pham
Assistant Examiner—Khai Tran
(74) Attorney, Agent, or Firm—Eitan, Pearl, Latzer & Cohen-Zedek

(57) ABSTRACT

An initial frame timing acquisition unit includes an initial timing estimator, and a combined frequency offset and refined timing estimator. The initial timing estimator determines a rough timing value from input data samples and a reference synchronization word. The combined frequency offset and refined timing estimator operates in the close vicinity of the rough timing estimate and determines the frequency offset and synchronization timing from the input data samples and the reference synchronization word.

10 Claims, 3 Drawing Sheets

SYNCHRONIZATION SYSTEM AND METHOD FOR DIGITAL COMMUNICATION SYSTEMS

FIELD OF THE INVENTION

The present relates to digital telecommunication systems generally and to synchronization of such telecommunication systems in particular.

BACKGROUND OF THE INVENTION

Mobile radio involves communication between mobile units and a base station via transmission of radio signals. One method of communication is known as Time Division Multiple Access (TDMA) in which a period of time is divided into multiple timeslots, each of which is assigned to a different communicating unit. In order for a receiving unit to decode the signals intended for it, the receiving unit must synchronize to the timeslot assigned to it. Therefore, each message sent to a receiving unit has a synchronization signal included therein. Once the receiving unit is synchronized to the sending unit, the receiving unit can decode the symbols being sent.

Unfortunately, the transmitted signal may be reflected off obstructions (such as trees, buildings, etc.) which are in the path between the sending and receiving units. The obstructions cause a portion or portions of the transmitted signal to arrive at the receiving unit after the main portion is received. This is known as multipath propagation and must be compensated within the receiving unit. If the mobile station is moving, the signal it receives can also be subject to fading.

Furthermore, the local oscillators which provide the timing and frequency basis in the mobile and base stations often drift apart. Of particular concern is that of frequency drift, or offset. The frequency offset increases the error probability in the receiving unit. In addition, it is typically desired that the mobile station lock onto the received frequency for transmission purposes, to enable the base station to decode the transmission of the mobile units without having to perform frequency acquisition.

U.S. Pat. No. 5,177,740 to Toy et al. describes a synchronization method which estimates the synchronization timing but has no correction for frequency offsets.

U.S. Pat. No. 5,343,498 to Toy et al. describes one synchronization system and method which initially estimates the timing of the synchronization words after which it estimates the frequency drift. The frequency offset is then corrected at the frequency of the local oscillator.

SUMMARY OF THE INVENTION

An object of the present invention is to provide a novel synchronization method for digital telecommunication systems which performs combined frame timing, symbol timing and frequency offset acquisition.

There is provided, in accordance with a preferred embodiment of the present invention, a method and unit for performing initial frame and symbol time acquisition for multipath channels with large frequency offsets and, if desired, with fading. A coarse time acquisition is initially performed using a metric that is insensitive to frequency offsets, after which a more accurate frame and symbol acquisition, along with hypothesis testing over a range of possible frequency offsets, is performed to achieve a final estimate of the timing and the frequency offset.

More specifically, there is provided, in accordance with a preferred embodiment of the present invention, a frequency offset synchronizer which includes an initial timing estimator and a combined frequency offset and refined timing estimator. The initial timing estimator determines a rough timing value from input data samples and a reference synchronization word. The combined frequency offset and refined timing estimator operates in the close vicinity of the rough timing estimate and determines the frequency offset and synchronization timing from the input data samples and the reference synchronization word.

Additionally, in accordance with a preferred embodiment of the present invention, the initial timing estimator includes a unit for performing a normalized differential correlation between the input data samples, shifted by a varying amount $\tau$, and the reference synchronization word and a selector for selecting the value of $\tau$ which provides the best correlation to be the rough timing estimate.

The combined frequency offset and refined timing estimator includes a log likelihood metric unit for determining a log likelihood metric between time and frequency shifted versions of the input data samples and the reference synchronization word and a selector for selecting the value of a time shift and a frequency offset which produce a minimum value of the log likelihood metric.

Moreover, the log likelihood metric means operates a multiplicity of times on different frames of data. It can include a frequency offset loop and a timing loop within the frequency offset loop. The frequency offset loop can be performed a multiplicity of times, each time reducing the range of frequencies of the loop but increasing the resolution.

The present invention incorporates the methods performed by the frequency offset synchronizer of the present invention and any digital communication system incorporating the method or synchronizer of the present invention.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 1:
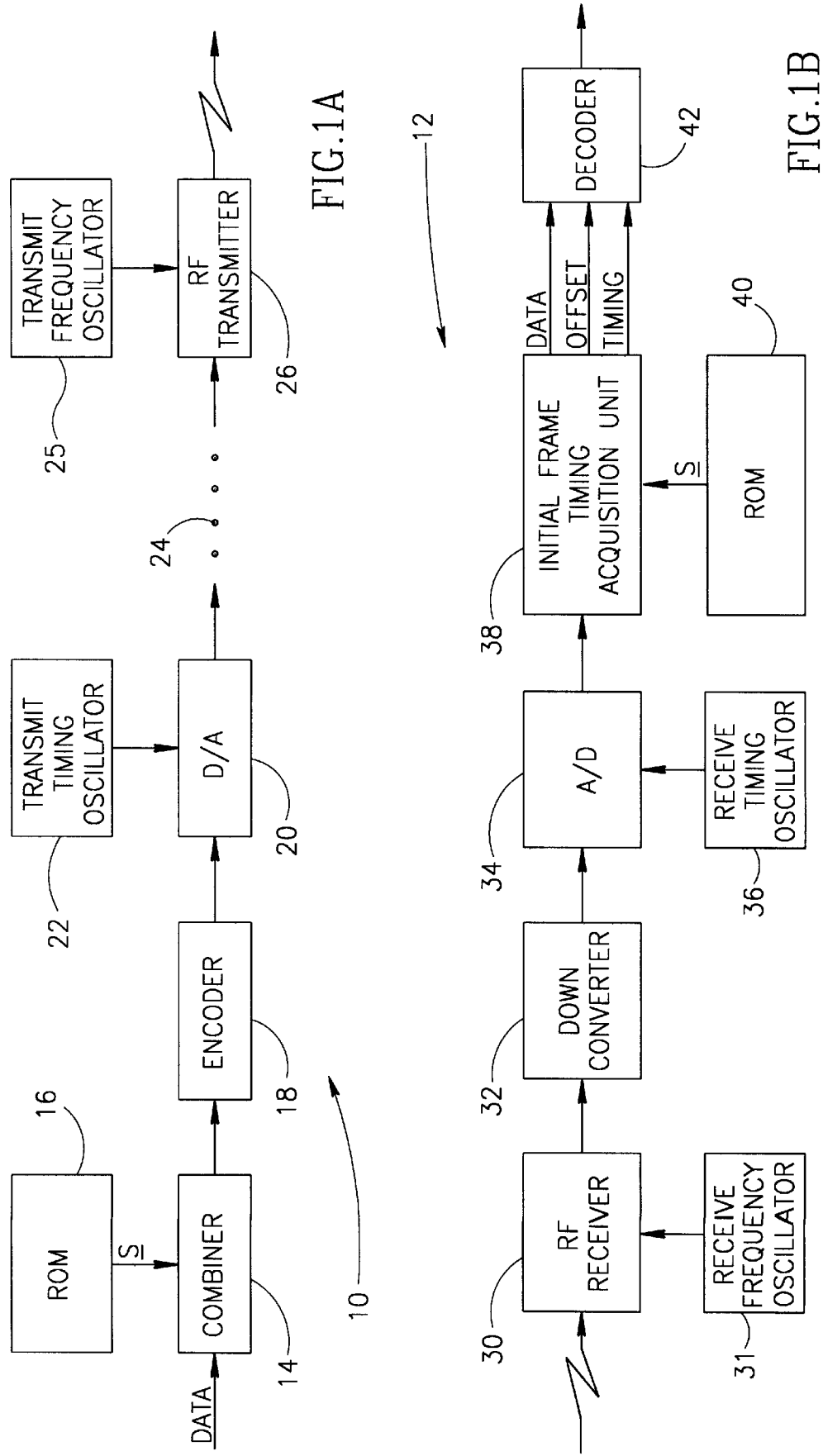
FIGS. 1A and 1B are schematic block diagram illustrations of a transmitter and a receiver, respectively, forming a digital radio communication system in accordance with a preferred embodiment of the present invention.

Reference is now made to FIGS. 1A and 1B which illustrate a transmitter 10 and a receiver 12, respectively, forming a digital radio communication system. The transmitter 10 of FIG. 1A is a typical transmitter and the receiver 12 of FIG. 1B includes an initial frame timing acquisition unit in accordance with a preferred embodiment of the present invention. The present invention will be shown for a time division multiple access (TDMA) digital communication system, it being appreciated that the present invention is implementable in all digital communication systems which provide a synchronization signal.

Data to be transmitted is provided to a combiner 14 which combines the data with a reference synchronization word s, formed of a sequence of symbols $s_i$, from a storage unit (such as a read only memory (ROM)) 16 and other required data in a standard format into a frame of data to be transmitted within one timeslot. Encoder 18 encodes the frame of data in any desired manner and maps consecutive bits to a symbol of a predetermined symbol constellation. Digital-to-analog (D/A) converter 20 converts the symbols to an analog signal in accordance with a timing signal based on the frequency of oscillation of a transmit timing oscillator 22. The analog signal is then further processed, indicated by dots 24, and the resultant signal is transmitted by radio frequency (RF) transmitter 26. The frequency of transmission is determined by a transmit frequency oscillator 25.

An RF receiver 30 of unit 12, operating at the frequency of a receive frequency oscillator 31, receives the transmitted signal which, in turn, is heterodyned by a down converter 32 to provide an intermediate frequency (IF) signal. The IF signal can be converted to a baseband signal, if desired. An analog-to-digital (A/D) converter 34 samples the IF signal, or alternatively, the baseband signal, at a rate determined by a receive timing oscillator 36, resulting in a plurality of received samples $y_i$.

It will be appreciated that the frequency of receive frequency oscillator 31 should match that of transmit frequency oscillator 25 although it is common that the two frequencies have an offset $\omega_{offset}$ therebetween. This offset must be determined and then compensated in order to accurately decode the symbol data and in order for the mobile unit to properly transmit to the base station.

In accordance with a preferred embodiment of the present invention, unit 12 also comprises an initial frame timing acquisition unit 38 which determines the offset $\omega_{offset}$ while synchronizing to the reference synchronization word s sent with the transmitted data. There are a plurality of possible reference words s, all of which are stored in ROM 40, of which only a known one is transmitted at a time. The output of acquisition unit 38, the offset $\omega_{offset}$ and the timing index j, are provided to a decoder 42 which utilizes the two variables to decode the received data.

Figure 2:
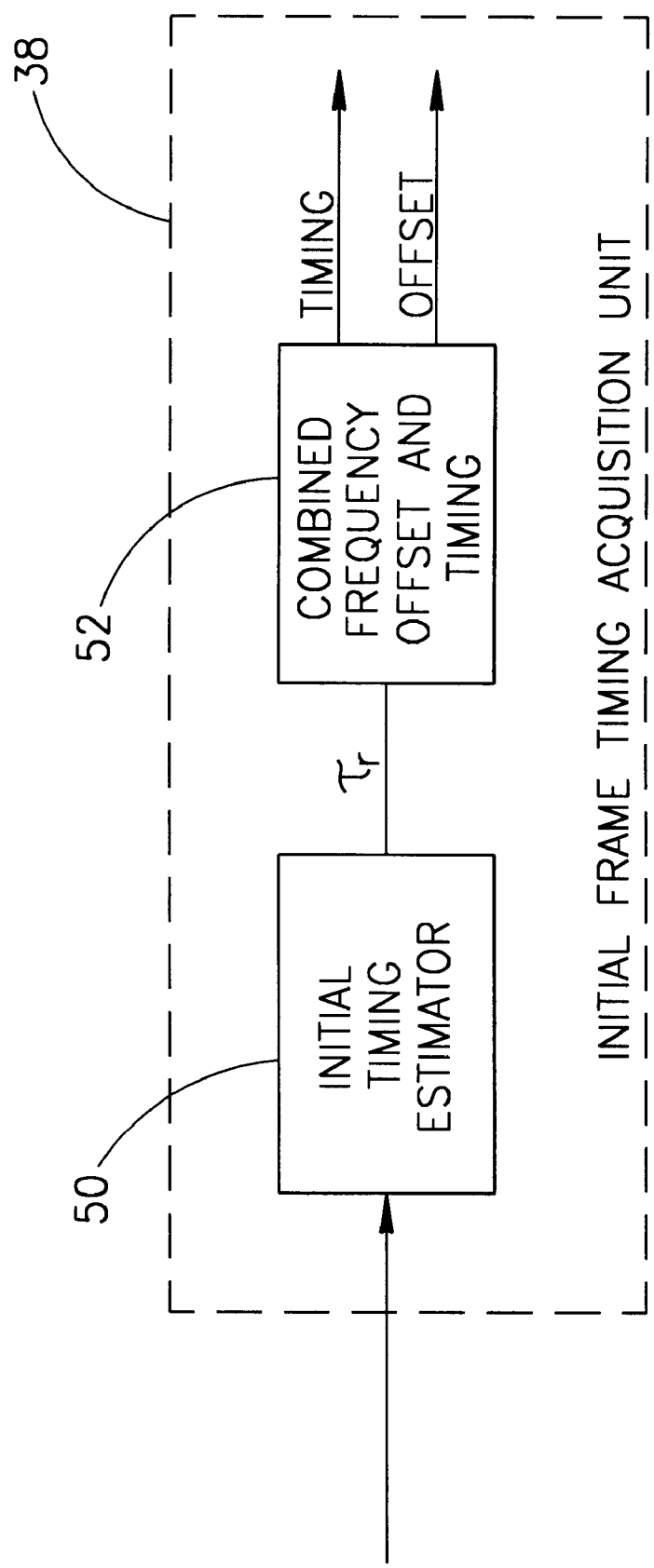
FIG. 2 is block diagram illustration of an initial timing acquisition unit forming part of the receiver of FIG. 1B.

As shown in FIG. 2 to which reference is now made, acquisition unit 38 comprises two elements, an initial timing estimator 50, which provides a rough timing estimate $\tau_r$, and a combined frequency offset and timing estimator 52 which refines rough timing estimate $\tau_r$ to produce the synchronization timing, while determining the frequency offset $\omega_{offset}$.

Initial timing estimator 50 utilizes a normalized differential correlation $\Lambda(\tau)$. An exemplary correlation is provided in Equation 1:

$$\Lambda(\tau) = \frac{Abs\left[\sum_{i=1}^{N_s} [RZ_i^* \cdot z_{\tau+i}]\right]}{\sum_{i=1}^{N_s} |y_{\tau+i}|^2} \quad \text{Equation 1}$$

where the $y_{\tau+i}$ are the received symbol samples sampled once per symbol and shifted by the amount $\tau$, where $\tau$ has a resolution of a fraction of a symbol $T_{symbol}$ (e.g. $T_{symbol}/4$), $z_i = y_i \cdot y_{i-1}^*$ is a received differential symbol, $s_i$ is one symbol of one reference sequence stored in ROM 40, $RZ_i = s_i \cdot s_{i-1}^*$ is a differential form of one transmitted reference symbol and * indicates the complex conjugate.

Equation 1 is determined for all possible time shift values $\tau$ and the reference sequence s belonging to the receiving unit. The value $\tau_r$ which produces a maximum (or peak) value $\Lambda(\tau)$ is the rough timing estimate.

Because Equation 1 is in a differential form and has an absolute value, it is insensitive to frequency offsets and therefore, can be utilized to provide the rough timing estimate $\tau_r$. The correlation (i.e. the nominator of Equation 1) provides the quality of the received data samples $y_i$ and the normalization with respect to the energy of the received data samples $y_i$ (i.e. the denominator) reduces any preference for strong signals over fading signals. Equation 1 is not optimal for a single path channel, but produces good results. In the multipath channel, instead of getting only one maximum as in the single path channel, we would get several peaks, all in the vicinity of the main peak. Accordingly, the timing estimate $\tau_r$ is just a rough estimate.

Combined frequency offset and timing estimator 52 utilizes the rough timing estimate $\tau_r$ to determine the synchronization timing while determining the frequency offset $\omega_{offset}$. Estimator 52 utilizes a log likelihood metric $C(y', h_{opt})$ of a signal passed through a multipath channel having additive white Gaussian noise (AWGN) as shown in Equation 2:

$$C(\underline{y}', \underline{h}) = \sum_{m=K}^{N_s} \left| y'_m - \sum_{k=1}^{K} h_k \cdot s_{m-k} \right|^2 = \sum_{m=K}^{N_s} |y'_m - \underline{h}_m \cdot \underline{s}_m|^2 \quad \text{Equation 2}$$

where $y_i' = y_{i+\tau_r \pm j}$ is a data sample shifted by the rough timing estimate $\tau_r$ and by a time index j which maximally has a value of J. J is typically of value 2–4 symbols. Equation 2 is also determined for the optimal vector $\underline{h}_{opt}$ of the channel taps $\underline{h}$, as provided in Equation 3 and Equation 4 hereinbelow. Since the channel is unlikely to vary quickly, the channel taps $\underline{h}$ are assumed constant over the length of the synchronization words.

The optimal channel tap vector $\underline{h}_{opt}$ for each value of time shift index j is produced by minimizing Equation 2 (via the least squares criterion), as follows:

$$\underline{h}_{opt} = \left(\sum_{l=K}^{N_s} \underline{s}_l^* \underline{s}_l\right)^{-1} \sum_{l=K}^{N_s} \underline{s}_l^* y'_l \quad \text{Equation 3}$$

where the length of all the vectors is taken as the memory of the channel, denoted here by K. For example, the channel memory might be of length 3. It is noted that the matrix $$\left(\sum_{l=K}^{N_s} \underline{s}_l^* \underline{s}_l\right)^{-1}$$

may be calculated in advance for all the possible synchronization words s, and it turns out that, for the synchronization words defined in the IS-55 TDMA standard, the matrix equals $(N_s - K) \cdot I_3$, where $I_3$ is the unit matrix of order 3, and thus Equation 3 reduces simply to:

$$\underline{h}_{opt} = \frac{1}{N_s - K} \sum_{l=K}^{N_s} \underline{s}_l^* y'_l \quad \text{Equation 4}$$

Equation 4 is the correlation between the shifted data samples and the transmitted synchronization word s.

To avoid the frequency offset problem, the log likelihood metric $C(y', h_{opt})$ is determined over the possible frequency offset span by first rotating the input samples $\tilde{y}_l' = y_l' \cdot e^{-jw_{offset}t}$ and then calculating $C(\tilde{y}',\underline{h}_{opt})$. The frequency offset $\omega_{offset}$ and the timing $\tau_r \pm j_l$ which minimize the log likelihood metric $C(\tilde{y}',\underline{h}_{opt})$ over the reduced time span $\tau_r \pm J$ are selected as the output frequency offset and synchronization timing.

Figure 3:
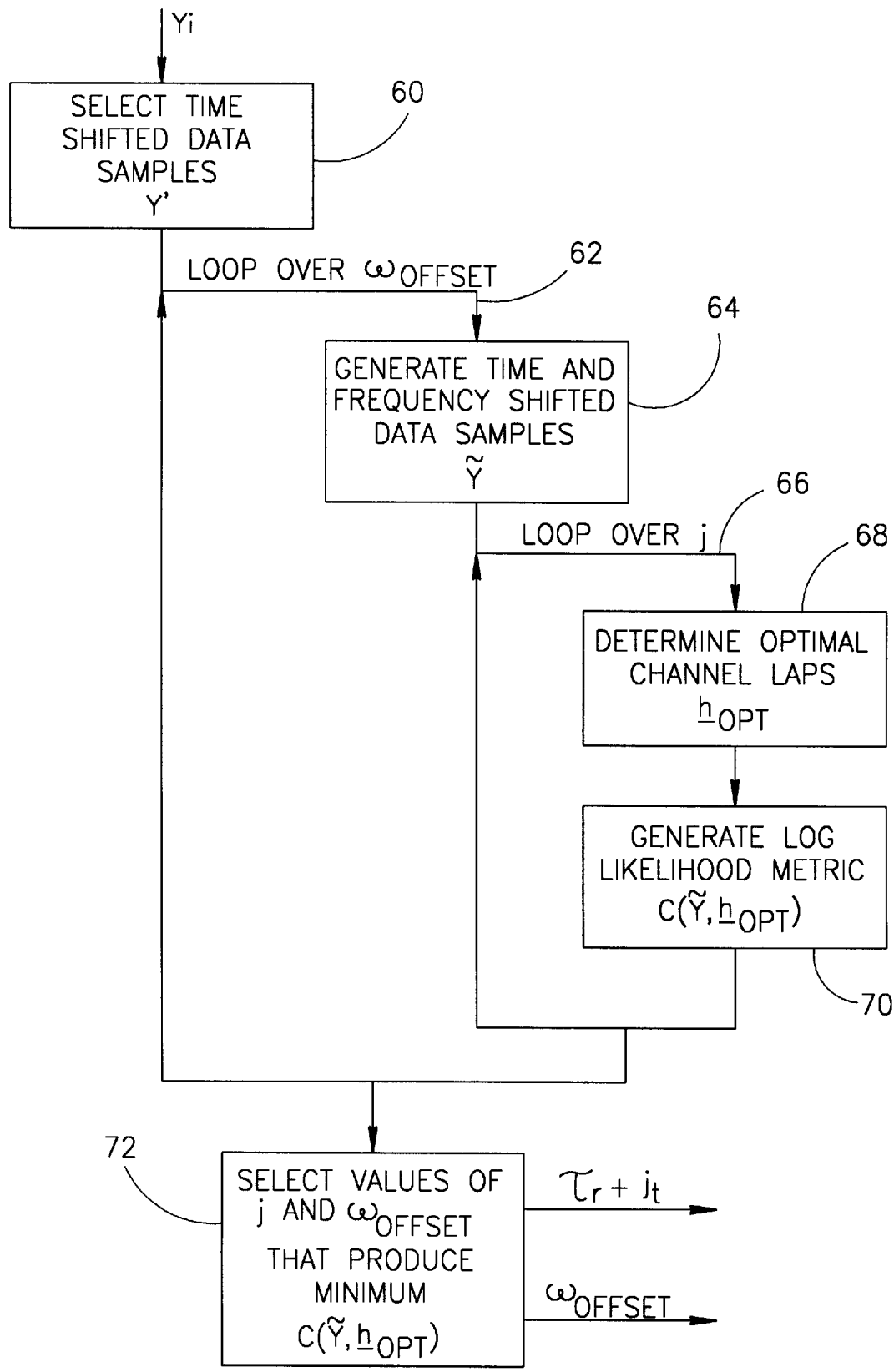
FIG. 3 is a flow chart illustration of the operations of a frequency offset and timing estimator forming part of the synchronizer of FIG. 2.

FIG. 3, to which reference is now made, illustrates the operations of estimator 52. Initially (step 60), estimator 52 selects the shifted data samples $y_i' = y_{i+\tau_r \pm j}, i=1 \to N_s, j=1 \to J$. Alternatively, estimator 52 can wait until the receiver receives data delayed by the amount $\tau_r$.

Estimator 52 then begins a loop (step 62) over a predetermined set of possible values of the frequency offset $\omega_{offset}$ and, in step 64, determines the current values of $\tilde{y}'$, the time and frequency shifted data samples for the current value of frequency and time indices $\omega_{offset}$ and j, respectively.

Estimator 52 then begins a loop (step 66) over the time shifting index j in which the current optimal channel tap vector $\underline{h}_{opt}$ is determined (step 68) from Equation 4 and the log likelihood metric $C(\tilde{y}',\underline{h}_{opt})$ is determined (step 70) from Equation 2.

When both the frequency and time loops 62 and 66, respectively, are finished, estimator 52 has a series of values for the log likelihood metric $C(\tilde{y}',\underline{h}_{opt})$. Estimator 52 then chooses the values of frequency and time indices $\omega_{offset}$ and j, which produced the minimum (i.e. best) value of the log likelihood metric $C(\tilde{y}',\underline{h}_{opt})$. Estimator 52 then produces the frequency offset $\omega_{offset}$ and the refined timing, which is simply $\tau_r + j_l$ (step 72).

It will be appreciated that the frequency offset loop 62 can be performed in two or more stages. In this embodiment, the selection operation of step 72 is performed within loop 62 and the frequency band (i.e. range of offset $\omega_{offset}$ frequencies) which provided the best results for that loop is divided into a finer resolution. Loop 62 is then repeated for the finer resolution frequency offsets. This provides a solution with a fine resolution on the frequency offsets with fewer computations than when calculating loop 62 for the entire range at the fine resolution.

For example, in the first stage, the frequency offset band can be divided into six sections, each of 1600 Hz for a spread of ±4800 Hz. For each section, the center frequency is utilized. Thus, loop 62 is performed six times, once at each of the center frequencies. In addition, the time shift range J is set as 2 $T_{symbol}$, where $T_{symbol}$ is the time between symbols, and the time step is 1/4 $T_{symbol}$.

From the output of the first stage, which is a two dimensional table of time shift j and center frequency offset $\omega_{offset}$, the entry which provides the smallest value of the log likelihood metric $((\tilde{y}',\underline{h}_{opt}))$ is selected. It is noted that the time shift j of the selected solution may still differ from the best solution since the center frequencies of the selected bands typically differ from the real frequency offset.

In the second stage, the selected frequency band is divided into ten finer bands, to achieve a fine frequency resolution of 160 Hz. Loop 62 is repeated for each band, where the frequency utilized is typically the center frequency of the fine band. Selection step 72 then selects the time and frequency shift values which produce the best log likelihood metric $C(\tilde{y}',\underline{h}_{opt})$, as described hereinabove.

It is further noted that the operations of estimator 52 can be repeated several times, on different input data samples, in order to improve the frequency offset estimation in the presence of fading. When the received synchronization word happens to be subject to a deep fade, the frequency estimation might err significantly. To overcome this, estimator 52 can operate on two data frames, comparing the frequency estimation results.

If the results agree (i.e. the frequency offsets $\omega_{offset}$ are less than some threshold, for example, 150 Hz apart), then estimator 52 averages the two frequency offsets. If desired, the average can be weighted by the signal to noise ratio (SNR) of the frames, the received signal strength indication (RSSI) of the frames or of any other weight.

If the results disagree, estimator 52 operates on a third frame and compares its results with the results of the two previous frames. If the results of the third frame are close to the results of one of the previous frames, then estimator 52 averages the two close frequency offsets, as described hereinabove. Otherwise, the frequency offset of the frame with the largest SNR or RSSI is chosen.

It is noted that, when a frequency offset exists, the received signal, including fading, multipath and noise, is spectrally shifted by the receive frequency oscillator 31, resulting in:

$$y_t = \left(\sum_{k=1}^{K} h_k \cdot s_{t-k} + n_t\right) e^{j\omega_{offset} t} \qquad \text{Equation 5}$$

Assuming that there is no noise and that the channel taps $\underline{h}$ are perfectly estimated, the log likelihood metric becomes:

$$C(\underline{y}', h) = \sum_{t=K}^{N_s} |y_t' - h_t \cdot s_t|^2 \approx \sum_{t=K}^{N_s} |h_t \cdot s_t \cdot (e^{j\omega_{offset} t} - 1)|^2 \qquad \text{Equation 6}$$

$$= \sum_{t=K}^{N_s} |\underline{h}_t \cdot \underline{s}_t|^2 \cdot |e^{j\omega_{offset} t} - 1|^2$$

$$= 2 \sum_{t=K}^{N_s} |\underline{h}_t \cdot \underline{s}_t|^2 \cdot (1 - \cos(\omega_{offset} t))$$

Since $1 - \cos(\omega_{offset} t)$ is a convex function when $|\omega_{offset} t| \leq \pi/2$, then if $$f_{offset} < \frac{1}{4(N_s - K) T_{symbol}},$$

the log likelihood metric will be a convex function with its minimum at $f_{offset} = 0$ (i.e. at the value for which we search). For example, for the IS-55 standard, $$T_{symbol} = \frac{1}{24300}, N_s = 14, K = 3$$

and thus, if $f_{offset} < 552$ Hz, the log likelihood metric will be a convex function. For larger frequency offsets, this convexity property no longer holds although the resultant values of the log likelihood metric are still larger than that of a zero frequency offset.

It is noted that the above analysis assumes that the real channel taps $\underline{h}$ are utilized which is typically not true. Despite this, simulations show good agreement with the above analysis. The convexity of the log likelihood metric function with respect to frequency offset ensures that a local minimum with respect to the frequency offset will also be a global minimum.

It will be appreciated that the present invention is not limited by what has been described hereinabove and that numerous modifications, all of which fall within the scope of the present invention, exist. For example, for better results, acquisition unit 38 could include only combined frequency offset and timing estimator 52. However, this is significantly more time and computationally expensive.

It will further be appreciated by persons skilled in the art that the present invention is not limited by what has been particularly shown and described herein above. Rather the scope of the invention is defined by the claims which follow:

What is claimed is:

1. A time division multiple access (TDMA) initial frame timing acquisition unit comprising:

an initial timing estimator which determines a rough timing estimate from input data samples and a TDMA reference synchronization word wherein said initial timing estimator comprises:

means for performing a normalized differential correlation between said TDMA reference synchronization word and said input data samples shifted by a variable amount; and means for selecting the value of said variable amount which provides the best correlation to be said rough timing estimate; and a combined frequency offset and refined timing estimator, operating in the close vicinity of said rough timing estimate, which determines the frequency offset and synchronization timing from said data samples and said reference synchronization word.

2. A TDMA initial frame timing acquisition unit according to claim 1 wherein said combined frequency offset and refined timing estimator comprises log likelihood metric means for determining a log likelihood metric between said TDMA reference synchronization word and time and frequency shifted versions of said input data samples and selection means for selecting the value of a time shift and a frequency offset which produce a minimum value of said log likelihood metric.

3. A TDMA initial frame timing acquisition unit according to claim 2 and wherein said log likelihood metric means operates separately on different frames of input data and includes means for averaging together, with a weighted average, the separate frequency offset outputs.

4. A TDMA initial frame timing acquisition unit according to claim 2 and wherein said log likelihood metric means comprises frequency offset loop means and timing loop means within said frequency offset loop means.

5. A TDMA initial frame timing acquisition unit according to claim 4 and wherein said log likelihood means includes means for operating said frequency offset loop means according to a first resolution on a first loop operation, means for selecting a range of frequency offsets which produce low values of said log likelihood metric and means for operating said frequency offset loop means at a finer resolution on said selected range of frequencies in a second loop operation.

6. A method for initial acquisition of frame timing for TDMA systems, the method comprising the steps of:

estimating a rough timing estimate from input data samples and a TDMA reference synchronization word, said step of estimating including the steps of:

performing a normalized differential correlation between said TDMA reference synchronization word and said input data samples shifted by a variable amount; and selecting the value of said variable amount which provides the best correlation to be said rough timing estimate; and in the close vicinity of said rough timing estimate, generating the frequency offset and synchronization timing from said input data samples and said reference synchronization word.

7. A method according to claim 6 wherein said step of generating includes the steps of determining a log likelihood metric between time and frequency shifted versions of said input data samples and said TDMA reference synchronization word and selecting the value of a time shift and a frequency offset which produce a minimum value of said log likelihood metric.

8. A method according to claim 7 and wherein said step of determining is performed on different frames of input data and the frequency offset output of said multiple steps of determining are averaged together with a weighted average.

9. A method according to claim 7 and wherein said step of determining includes the steps of looping on a range of frequency offsets and looping on a range of timing values, said second step of looping occurring within said first step of looping.

10. A method according to claim 9 and step of determining includes the steps of performing said first frequency offset loop according to a first resolution on a first loop operation, selecting a range of frequency offsets which produce low values of said log likelihood metric and performing said first frequency offset loop at a finer resolution on said selected range of frequencies in a second loop operation.

* * * * *